INVENTORS:
LESLIE E. GIBBS
RALPH S. WARNER

March 28, 1967 L. E. GIBBS ETAL 3,311,783
IGNITION SYSTEM WITH ELECTRONIC DISTRIBUTION AND CONTROL
Filed April 7, 1964 6 Sheets-Sheet 3

INVENTORS:
LESLIE E. GIBBS
RALPH S. WARNER
BY Howson & Howson
ATTYS.

March 28, 1967 L. E. GIBBS ETAL 3,311,783
IGNITION SYSTEM WITH ELECTRONIC DISTRIBUTION AND CONTROL
Filed April 7, 1964 6 Sheets-Sheet 4
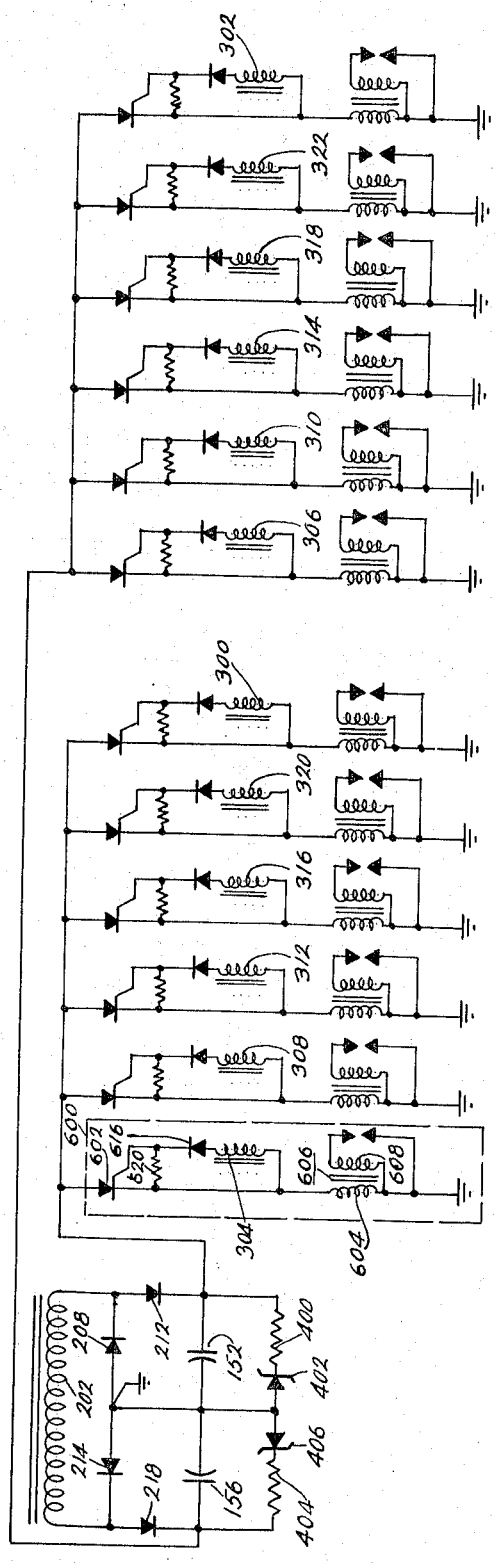
FIG.5.
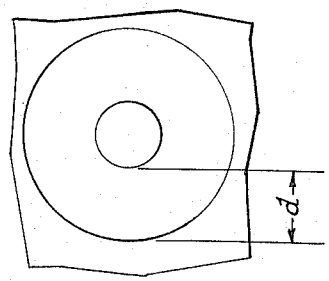
FIG.9E.
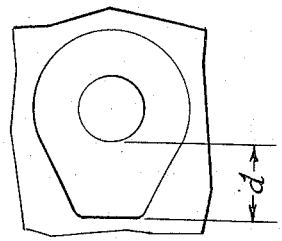
FIG.9D.
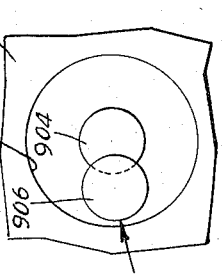
FIG.9C.
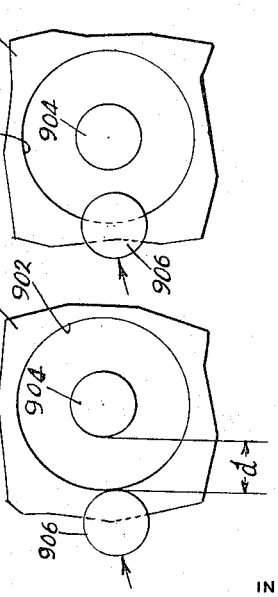
FIG.9B.
FIG.9A.
INVENTORS:
LESLIE E. GIBBS
RALPH S. WARNER
BY Howson & Howson
ATTYS.

March 28, 1967 L. E. GIBBS ETAL 3,311,783
IGNITION SYSTEM WITH ELECTRONIC DISTRIBUTION AND CONTROL
Filed April 7, 1964
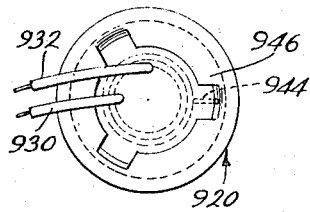
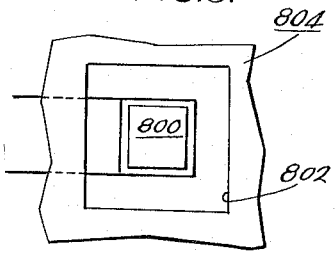
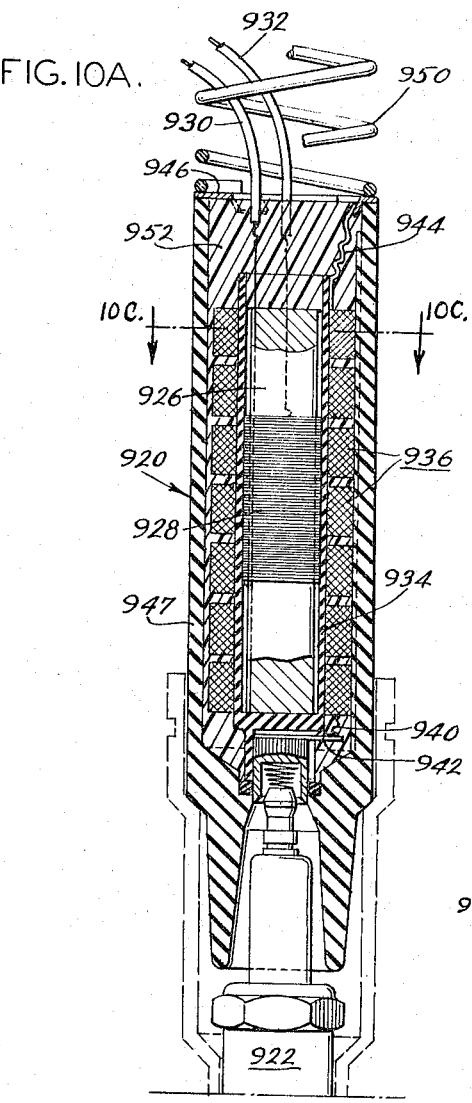
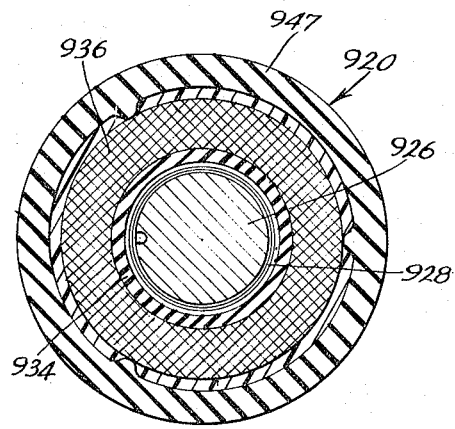
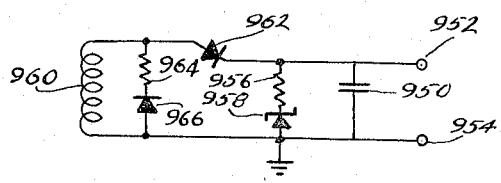
INVENTORS:
LESLIE E. GIBBS
RALPH S. WARNER
BY Howson & Howson
ATTYS.

United States Patent Office 3,311,783
Patented Mar. 28, 1967

3,311,783
IGNITION SYSTEM WITH ELECTRONIC
DISTRIBUTION AND CONTROL
Leslie E. Gibbs, Wilbraham, and Ralph S. Warner, East Longmeadow, Mass., assignors to American Bosch Arma Corporation, Springfield, Mass., a corporation of New York
Filed Apr. 7, 1964, Ser. No. 358,015
15 Claims. (Cl. 315—226)

This invention relates to ignition apparatus suitable for use in connection with internal combustion engines, and particularly to improvements in such systems of the class in which the usual breaker apparatus is replaced by electronic circuitry.

In the usual internal combustion engine of the prior art, combustible fuel is ignited during sequential time intervals synchronized with the phases of operation of the engine through the medium of a breaker and associated breaker points together with a mechanical rotating distributor, in well known manner. More recently, systems have been proposed in which the breaker apparatus and the mechanical distributor are replaced by electronic circuitry for performing similar functions in response to electrical timing impulses produced by, and in synchronism with, engine operation. The present invention is concerned with such systems in which the mechanical breaker, and preferably also the mechanical distributor, are eliminated and replaced by electronic apparatus.

In such systems of the class with which the present invention is primarily concerned, it is highly desirable to provide for reliable fuel ignition, especially at high engine speeds and with large numbers of cylinders, and even under adverse environmental conditions. It is also desirable to provide these features in a system which is compatible with, and readily capable of substitution into, engine systems of existing types, and which can readily be designed to provide desired timing characteristics.

Accordingly it is an object of our invention to provide a new and useful engine ignition system.

Another object is to provide such a system which is capable of reliable operation at high engine speeds.

Another object is to provide such a system which is especially adapted for use with engines having a large number of cylinders and/or using odd, as opposed to even, engine firing times.

A further object is to provide such a system which provides effective ignition despite adverse conditions such as unclean sparkplugs for example.

Still another object is to provide such a system which is convenient and versatile in that automatic timing advance is provided which can readily be tailored to a particular engine.

It is also an object to provide such a system which is compatible with, and readily capable of substitution into, engines of known types, and is simple in form.

In accordance with the invention, these and other objects are achieved by the provision of a new and useful engine ignition system embodying a number of novel features each of which contributes to the attainment of one or more of the above objects and all of which cooperate with each other to provide a complete ignition system which provides the above desirable features to a high degree. In accordance with one feature of the invention, a source of a train of voltage pulses, such as an alternating current generator driven by the engine shaft, is connected to a plurality of separate capacitive means to charge them. The separate capacitive means are separately connected by controllable switching means to an equal plurality of corresponding different sets of fuel-ignition means for the engine, each of which ignition means may include the usual sparkplug as the fuel-igniting element, for example. Preferably there are two capacitive means and two sets of ignition means. Thus in a twelve-cylinder engine six of the igniting elements may be connected one of the two capacitive means and the other six to the other of the two capacitive means. Control pulses generated in synchronism with engine operation are supplied to the switching means in such manner that the plurality of capacitive means are discharged sequentially through their associated ignition means, each such discharge producing a voltage pulse for igniting the fuel. For example, when using two capacitive means first the gas in a cylinder of one set of six cylinders is ignited by discharge of one of the capacitive means, and then gas in a cylinder in the other set is ignited by discharge of the other capacitive means, and so on. The effect of this sequential discharging of the plurality of capacitive means is to provide a greater effective interval between successive discharges of a given one of the capacitive means than would exist if only a single capacitive means had been employed. This greater effective interval between successive discharges of a given capacitive means has been found to be of practical importance in providing sufficient time for the corresponding switching means to regain fully its blocking condition, and for the capacitive means to be adequately re-charged. With this arrangement the engine may be operated reliably at higher speeds, without reaching the condition in which the time between successive discharges of the capacitive means becomes so short that an actuated switching means cannot fully recover its blocking characteristic and that the capacitive means cannot recharge in the interval between successive ignitions of the fuel. Accordingly more reliable high-speed operation of the engine is provided.

In a preferred embodiment of the invention the above-mentioned train of pulses comprises pulses of alternately opposite polarities produced by an electrical generator which may comprise the flux-switching elements of an ordinary magneto having a single output winding thereon. The pulses of alternate polarity are then supplied to a split-bridge type rectifier, one half of the bridge supplying charging pulses to one capacitive means and the other half of the split-bridge rectifier supplying charging pulses to another capacitive means, the polarities of the voltages thus developed across each of the capacitive means preferably being the same with respect to a reference potential. At least one charging pulse is applied to each capacitive means for each discharging thereof.

As a further preferred feature, the pulses of alternate polarity are produced across an inductor and are limited to a predetermined maximum amplitude by means of a pair of branch circuits each connected across a portion of the inductor, one branch comprising a series combination of a rectifier and a zener diode having their forward directions of conduction opposed to each other, and the other branch circuit also comprising a rectifier and a zener diode which however are connected in polarities opposite to those in the first branch circuit. The effect of these elements is to produce a substantial short-circuit across a portion of the inductor when the pulse amplitude exceeds a predetermined value determined by the break-down voltage of the zener diodes, and thus to prevent the application of excessive voltage to the capacitive means and to the ignition means supplied therefrom.

In accordance with a further feature of our system, the control pulses for controlling the times at which the capacitive means are discharged are produced by an arrangement for moving a magnet and an inductor past each other, as by rotating a pole of a magnet past an inductor radially spaced from the center of rotation of the magnet, thereby to induce a pulse in the inductor each time the inductor and magnet pass each other, and further com prises an apertured plate of magnetic material interposed between the inductor and magnet during part of their relative motion and having an aperture therein of limited circumferential extent which is substantially aligned with the inductor and with the magnet when the inductor and magnet pass each other. The arrangement is such that the plate provides a relatively low reluctance path for the magnet flux until the inductor and magnet are nearly aligned with the aperture in the plate, at which time the flux through the inductor increases abruptly to produce an abrupt increase of magnetic flux through the inductor and a corresponding step-fronted voltage pulse therein. This is advantageous in providing a usefully large amplitude of voltage pulse to the inductor, and is particularly advantageous when a number of inductors are spaced circumferentially from each other around the plate, each of which inductors is to produce a control pulse for controlling ignition in a different cylinder. In the latter case the use of a plate having an aperture corresponding to each inductor permits the inductors to be spaced relatively near each other without introducing substantial flux changes in more than one inductor at a time. This is again particularly advantageous at high engine speeds where, without the apertured plate, substantial pulse voltages may tend to occur simultaneously in adjacent inductors and thus produce unreliability in the desired sequential actuation of the igniting elements of the engine. Furthermore, the size and shape of the one or more apertures in the plate of magnetic material can be selected to provide a predetermined degree of automatic advance of the timing with increases in engine speed, so that the system can be adapted to different engine applications by using the same rotating magnet arrangement and inductor system while merely varying the aperture arrangement in the plate. In accordance with another feature, each inductor is preferably surrounded on at least two opposite sides by an individual yoke element of magnetic material which provides a low-reluctance magnetic path between the apertured plate and the vicinity of the remote end of the inductor. This not only reduces cross-talk between adjacent inductors but also provides shielding of the inductor from extraneous external magnetic fields.

In accordance with another feature which is preferably utilized in our system, each of the ignition means through which the capacitive means are discharged comprises a step-up voltage transformer, each voltage step-up transformer being physically located adjacent the corresponding igniting element for igniting fuel in the engine. The transformer is of a high-frequency type such as is used in certain high-frequency applications in radio or television work, for example, having a magnetic core of a high-frequency material, such as ferrite, and having a secondary winding of the low-distributed-capacitance type such as a pi or universal winding. The use of such a transformer effectively preserves the rapid rise time of pulses supplied thereto, which not only makes for more accurately timed firing of the igniting element but also provides better and more reliable firing of the igniting elements under adverse conditions, such as where the igniting elements are fouled plugs; and, because the transformer is capable of maintaining a narrow pulse, there is less total electrical energy provided to each igniting element which tends to increase the useful operating life of the igniting elements.

It will be appreciated that while each of the several features described generally above represents a useful and advantageous improvement in electronic ignition systems for engines, when all are used together they cooperate in a manner to produce especially advantageous characteristics for the system. For example, all cooperate to produce the desired objective of reliable operation at high engine speeds. Thus the use of plural capacitive means each used in connection with a different set of ignition means permits the rapid repetitive discharging and recharging of the capacitors required at high engine speeds; the apertured plate arrangement provides sharp, accurate control pulses with small cross-talk as is also important for high-speed engine operation; and the use of a high-frequency, voltage step-up transformer for preserving rapid pulse rise and for preserving relatively narrow pulse widths is also significant in providing reliable and accurate operation at high engine speeds.

These and other features and advantages of the invention will become more readily apparent from a consideration of the following detailed description, taken in connection with the accompanying drawings, in which:

FIGURE 3 is an electrical schematic diagram illustrating an alternative form for a portion of the circuit of FIGURE 2;

FIGURE 5 is an electrical schematic diagram illustrating another preferred form for the electrical circuitry of a system in accordance with the invention;

FIGURE 8 is a fragmentary plan view of an alternative form for the aperture and inductor of FIGURE 4B;

FIGURES 9A, 9B and 9C are schematic representations to which reference will be made in explaining the relation between speed of engine operation and the generation of control pulses in accordance with the invention in one aspect;

FIGURES 9D and 9E are representations of the same type as FIGURES 9A, 9B and 9C, illustrating alternate shapes and dimensions for the apertures in the plate of magnetic material utilized in accordance with certain preferred forms of the invention;

Figure 2:
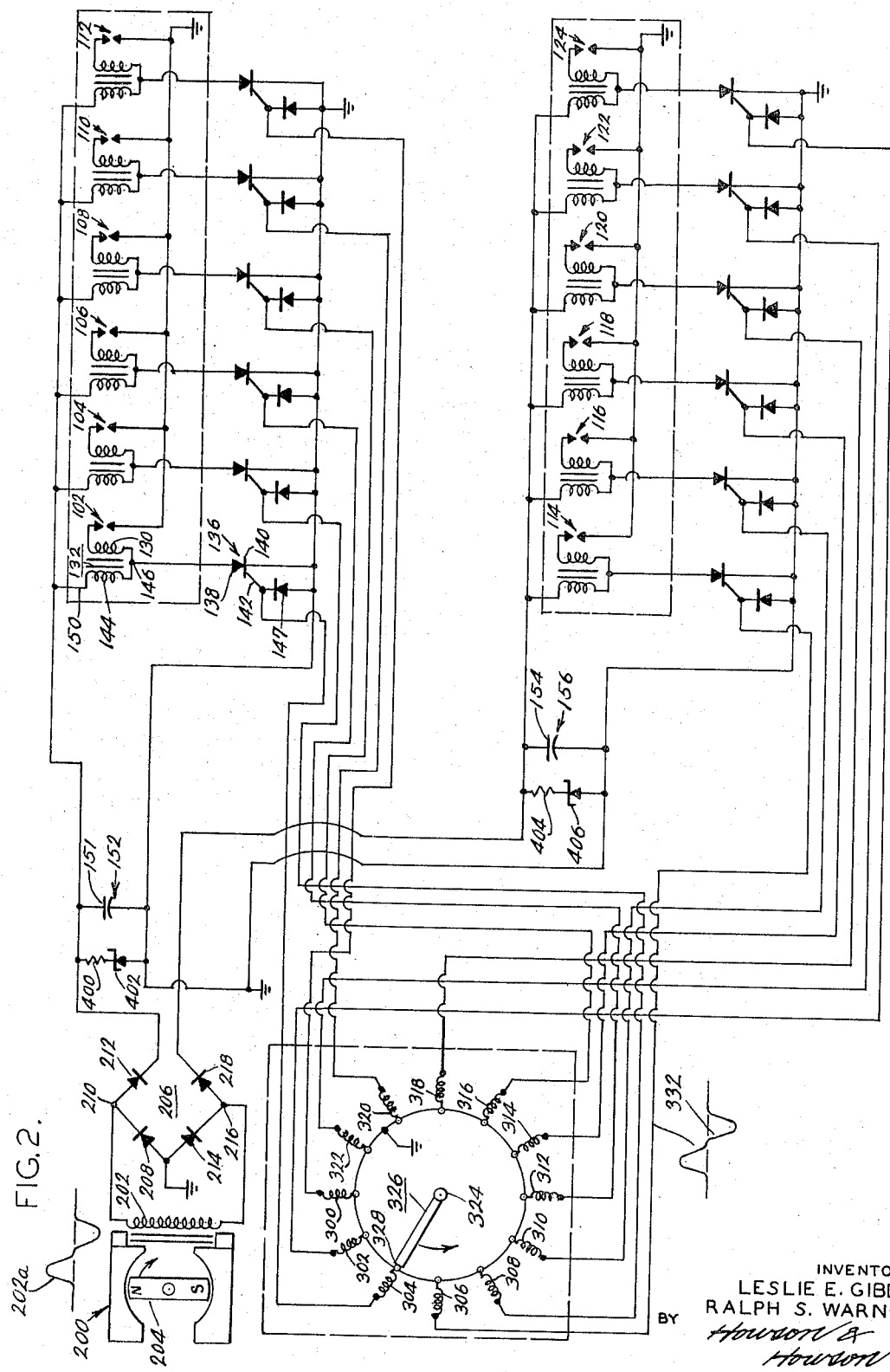
FIGURE 2 is an electrical schematic diagram illustrating the electrical aspects of one preferred embodiment of the invention.

FIGURES 10A, 10B, and 10C are longitudinal sectional, elevational plan, and transverse sectional views respectively of a voltage transformer arrangement in accordance with one preferred embodiment of the invention; and FIGURE 11 is an electrical schematic diagram illustrating an alternative form for one portion of the circuitry of FIGURE 2.

Figure 1:
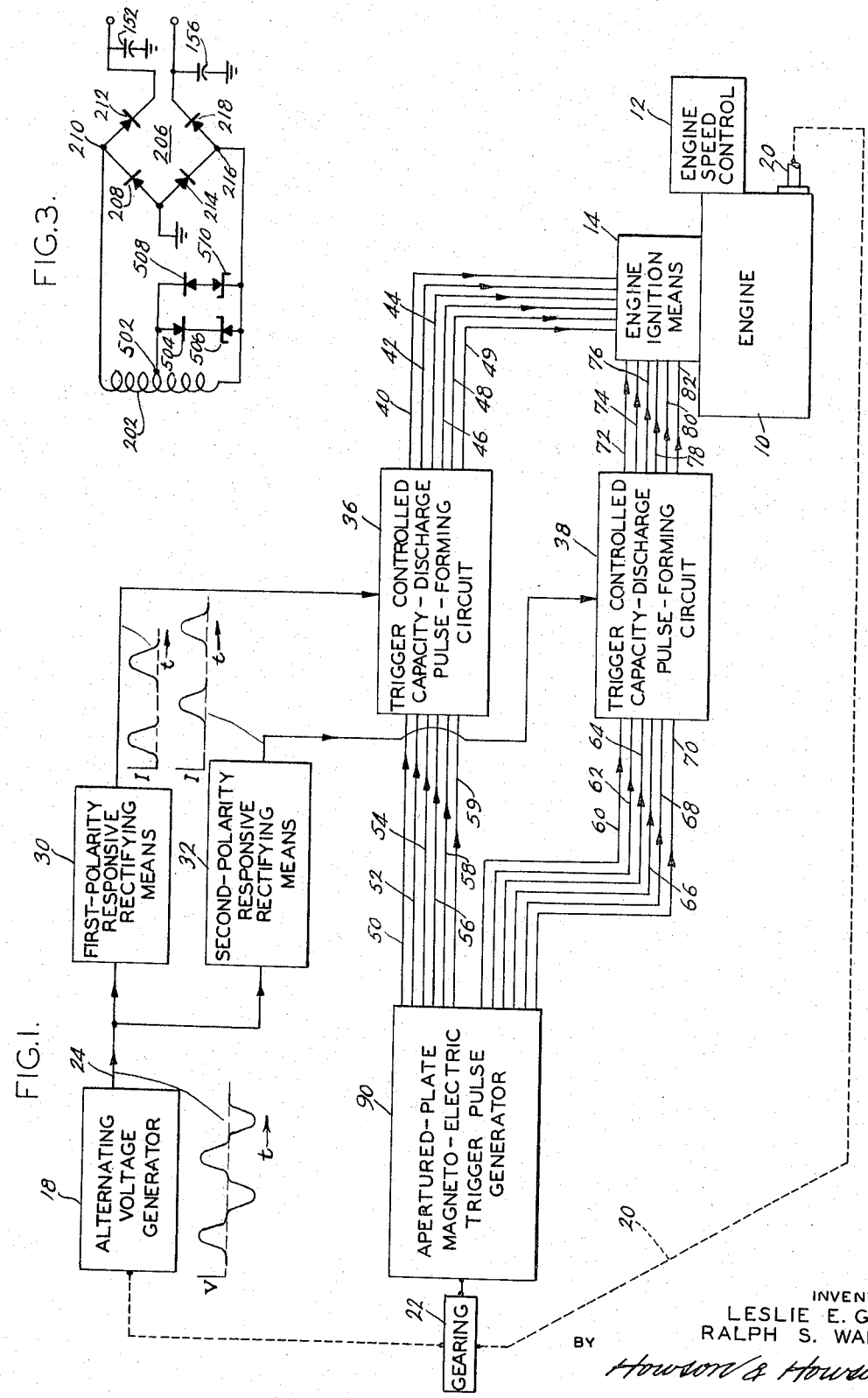
FIGURE 1 is a block diagram illustrating an over-all system in accordance with a preferred form of the invention.

Referring now to the embodiment of the invention illustrated by way of example in FIGURE 1, there is represented therein an engine 10 which may be a conventional gasoline engine provided with an engine speed control 12 such as the usual accelerator, and in this example it will be assumed that the engine has twelve cylinders each with associated sparkplug for igniting gas in the corresponding cylinder, and that the engine 10 is of the usual four-cycle type.

Timed firing of the gas in the cylinders is provided by engine ignition means 14, which will ordinarily comprise in this example circuitry including twelve sparkplugs, one for each cylinder of engine 10. The function of the remainder of the system of FIGURE 1 is to provide appropriate voltage pulses to the engine ignition means in sequence so that each voltage pulse fires the proper sparkplug at the proper time.

To accomplish this there is provided an alternating voltage generator 18 which is driven from the engine crank shaft 20 by way of appropriate gearing 22, so as to produce at its output terminal 24 a train of pulses of alternating polarity in synchronism with rotation of crank shaft 20. The gearing 22 is such as to provide the desired integral multiple relationship between the frequency of rotation of crank shaft 20 and the frequency of recurrence of the pulses at the output 24 of generator 18. In the present example the alternating voltage generator 18 may comprise a modified conventional magneto in which the primary and secondary coils are removed, and replaced by an output winding preferably having a greater number of turns than are usually used in the primary winding of a magneto. Assuming that the magneto is of the type which produces one positive and one negative output pulse for each complete rotation of its armature, the gearing 22 may in the present example provide a 3 to 1 step-up from engine crank shaft to the rotor of the generator, so that six positive and six negative pulses are produced at the output of generator 18 for each two complete revolutions of the engine crank shaft. It will be understood that to reduce the required rotor speed the number of poles on the rotor may be increased and the gear ratio reduced proportionately to preserve the same generator output pulse frequency.

The pulse train from generator 18 is applied in parallel to a first-polarity responsive rectifying means 30 and a second-polarity responsive rectifying means 32, rectifying means 30 for example being responsive only to the positive pulses from generator 18 and rectifying means 32 being responsive only to the negative pulses of the pulse train to pass current. Preferably the rectifying means 30 and 32, as described in detail hereinafter, produce output current pulses of the same polarity, the pulses from rectifying means 30 however occurring alternately with pulses from rectifying means 32 as indicated by the waveforms in the figure.

The pulses from rectifying means 30 are applied to trigger-controlled, capacity-discharge, pulse-forming circuit 36, while the output of rectifier means 32 is supplied to trigger-controlled, capacity-discharge, pulse-forming circuit 38. Each of the circuits 36 and 38 responds to the input current pulses supplied thereto from the corresponding one of the rectifying means 30 and 32, to charge a capacitor therein in response to each of the input pulses. Circuit 36 has in this example six output connections 40, 42, 44, 46, 48 and 49 each of which is effective to produce a capacity discharge from circuit 36 through a different particular one of the sparkplugs in engine ignition means 14, depending upon which of the input lines 50, 52, 54, 56, 58 and 59 is supplied with a trigger control pulse for triggering the discharge.

More particularly, input leads 50, 52, 54, 56, 58 and 59 are responsive to input trigger pulses to fire the six different sparkplugs connected to output leads 40, 42, 44, 46, 48 and 49, respectively. Similarly, trigger pulses applied to input leads 60, 62, 64, 66, 68 and 70 are effective to produce firing of a different set of six sparkplugs in engine ignition means 14 by way of the output lines 72, 74, 76, 78 80 and 82, respectively, of circuit 38. Accordingly to produce firing of any one of the twelve cylinders by the engine ignition means 14, it is only necessary to apply a trigger control pulse to the appropriate corresponding one of the trigger input lines 60–70.

To generate the necessary trigger pulses at the required times in relation to the phase of engine operation for which fuel combustion is desired, there is preferably employed an apertured-plate magneto-electric trigger pulse generator 90. In general, as described in detail hereinafter, trigger pulse generator 90 may comprise a number of inductors equal to the number of cylinders in the engine, spaced from each other circumferentially around a center, and a magnet having a pole which is rotated about said center so as to induce pulses sequentially in the several inductors. In the present example twelve inductors are used, and the trigger pulse generator 90 may have its rotating element geared to crank shaft 20 of engine 10 by way of a 1 to 2 stepdown gear ratio so that trigger pulses are produced by the generator at a rate of six for each revolution of shaft 20. The connections from the pulse-forming circuits 36 and 38 to the twelve cylinders of the engine, and the connections from the trigger-pulse generator 90 to the twelve input connections for the two pulse-forming circuits 36 and 38, are so arranged that trigger control pulses are produced at the output leads of generator 90 on the proper leads for effecting the desired sequence of sparkplug firing, this sequence being selected in appropriate fashion for the particular engine application according to principles well known in the art.

Broadly speaking then, the engine sparkplugs are divided into two sets, each set being actuated from a different pulse forming circuit. The choice of which sparkplugs are connected to pulse-forming circuit 36 and which to pulse-forming circuit 38 is such that successive sparkplug firings are produced by the two pulse-forming circuits alternately. The details of circuitry and construction of the overall system and of the various elements thereof, as well as the features and advantages thereof, will now be described with specific reference to the more detailed showings of the other drawings.

Referring to FIGURE 2, there is shown a first set of six sparkplugs 102, 104, 106, 108, 110 and 112, and a second set of sparkplugs 114, 116, 118, 120, 122 and 124. It is understood that each of these twelve sparkplugs is associated with a different cylinder of the engine 10 of FIGURE 1 and each responds to a voltage pulse applied across it during the combustion stroke in the cylinder with which it is associated to ignite the fuel therein. Sparkplug 102 has one of its terminals grounded and its other terminal connected to one terminal of the secondary winding 130 of the voltage step-up transformer 132. The other terminal of secondary 130 is connected to ground by way of an electronically-controlled switch in the form of a silicon controlled rectifier 136 having an anode element 138, a cathode element 140 and a control element 142. The silicon controlled rectifier is of the usual type which is non-conductive when its control electrode 142 is at the same potential as its cathode 140, but becomes strongly conductive in thyratron fashion when its control electrode 142 is made sufficiently positive with respect to its cathode 140.

One end of the transformer primary 144 is connected to a common junction 146 between secondary 130 and the anode 138 of silicon controlled rectifier 136. A diode 147 is also provided with its anode connected to ground and its cathode connected to the control electrode 142 of silicon controlled rectifier 136. Each of the sparkplugs 104, 106, 108, 110, 112, 114, 116, 118, 120, 122 and 124 is connected to ground and to a voltage step-up transformer, a silicon controlled rectifier and a diode in exactly the same manner as described with reference to sparkplug 102, and this description therefore need not be repeated in detail.

The upper or input end 150 of transformer primary 144 is connected to the upper plate 151 of the capacitive means 152, which may comprise an ordinary capacitor, the other plate of the capacitive means 152 being connected to ground. Each of the transformer primary windings associated with the sparkplugs 102, 104, 106, 108, 110 and 112 is connected in identical manner to the plate 151 of capacitive means 152. The corresponding upper or input ends of each of the transformer primary windings associated with the sparkplugs 114, 116, 118, 120, 122 and 124 are similarly directly connected to the upper plate 154 of another capacitive means 156, which may be a capacitor identical with capacitor 152, the other plate of capacitive means 156 being grounded.

Accordingly, if capacitor 152 is charged so that its upper plate 151 is positive to ground, no current will pass through any of the transformer primaries connected thereto so long as the control electrodes such as 142 of the corresponding silicon controlled rectifiers are at ground potential so as to provide a current blocking action. However, if a positive pulse is applied to the control electrode of any one of the silicon controlled rectifiers associated with the six sparkplugs 102–112, the charged capacitor 152 will discharge suddenly through the primary of the transformer connected to that silicon controlled rectifier, will generate a high-voltage pulse in the associated transformer secondary, and will fire the corresponding plug. Similarly, when capacitor 156 is in a charged condition, any of the sparkplugs 114–124 will be fired in response to the rendering conductive of the silicon controlled rectifier connected with that sparkplug by positive pulses applied to the control electrode of the corresponding silicon controlled rectifier. It is the primary function of the remainder of the apparatus illustrated in FIGURE 2 to provide the requisite charging of the two capacitive means 152 and 156 and the properly timed turning-on of the various silicon controlled rectifiers in order to effect the desired sequential firing of the plugs.

In this embodiment, the electric apparatus for charging the capacitive means 152 and 156 comprises a source of alternating voltage represented in this case as a modified magneto 200 having an output coil 202 in place of the usual primary and secondary coils. The rotating magneto armature of magnetic material is represented as 204, and is driven in rotation, through appropriate gearing and mechanical linkage, by the engine crank shaft as indicated in FIGURE 1. As a result there is produced across the coil 202 a voltage waveform similar to that shown at 202a for each complete revolution of the armature 204.

Opposite ends of the coil 202 are connected respectively to the opposite junctions of a split-bridge rectifier circuit 206. More particularly, the split-bridge rectifier circuit 206 comprises a first diode 208 having its anode grounded and its cathode connected to the bridge junction 210, a second diode 212 having its anode connected to junction 210 and its cathode connected to the upper plate 151 of capacitive means 152, a third diode 214 having its anode grounded and its cathode connected to the bridge junction 216, and a fourth diode 218 having its anode connected to the bridge junction point 216 and its cathode connected to the upper plate 154 of capacitive means 156.

The function of the split-bridge rectifier circuit 206 is in effect to apply the positive pulses of the waveform 202a to the upper plate 51 of capacitor 152 to charge it positively, and to apply the negative pulses of waveform 202a to the upper plate of capacitor 156 to charge it also positively. This is accomplished by virtue of the fact that when the upper end of the coil 202 is positive with respect to its other end, positive current can flow from junction 210 through diode 212 to capacitor 152 but cannot pass through diode 218 or otherwise to capacitor 156; while during the intervals when the waveform 202a is negative, the lower end of the coil 202 is more positive than its upper end and, during these time intervals, positive current can flow through diode 218 to capacitor 156 but not through diode 212 to capacitor 152. Accordingly capacitors 152 and 156 are charged alternately to a positive voltage, once for each rotation of armature 204 of magneto 200. As mentioned previously, the voltage which is produced on each of the two capacitive means 152 and 156 is applied in parallel to all of the primary windings associated with one of the sets of six sparkplugs, as described above.

To generate the trigger control pulses for turning on the silicon controlled rectifiers and firing the sparkplugs in sequence, there is employed in this example an array of twelve inductors 300, 302, 304, 306, 308, 310, 312, 314, 316, 318, 320 and 322 spaced circumferentially and equiangularly from each other about a center 324, and a magnet rotor 326 arranged to rotate about center 324 so that one of its poles 328 is successively aligned with different ones of the inductors. The end of each inductor nearer the rotor is grounded, and the other end of each of the inductors is connected to a different one of the control electrodes of the twelve silicon controlled rectifiers. As the magnet pole 328 is rotated through the region adjacent each of the inductors, a positive and negative voltage waveform similar to that shown at 332 is produced at the ungrounded end of that inductor. The result, as exemplified for the case of silicon controlled rectifier 136, is that the control electrode 142 of the silicon controlled rectifier is normally at ground, so that the silicon controlled rectifier is in its blocking or open-circuit condition and then comprises in effect an open electronic switch; however, when the magnet pole is near alignment with the corresponding inductor, a positive pulse is generated in the inductor and applied to the control electrode 142 to render it conductive, thereby permitting the corresponding capacitive means 152 to discharge through the associated primary coil 144 and fire the associated sparkplug 102. The negative portion of the voltage waveform generated in the inductor is effectively short-circuited to ground by the diode 147 connected between the control electrode of the silicon controlled rectifier 136 and ground. The same action occurs in sequence in the eleven other ignition circuits to fire the other eleven sparkplugs in sequence.

In the operation of the electrical system of FIGURE 2, the gearing between the motor crank shaft 20 (FIG. 1) and the armature 204 of magneto 200 and the magnet rotor 326 is preferably such that for each time that a charging pulse is applied to one of the capacitive means 156 or 152, a trigger pulse is applied to one of the silicon controlled rectifiers. For example, in a four-cycle engine in which the crank shaft rotates twice for each firing of any given sparkplug, the magnet rotor 326 is arranged to rotate once for each two revolutions of the crank shaft to produce sequential firing of all twelve sparkplugs in this time. During the same two revolutions of the crank shaft the magneto armature 204 will rotate six times, charging each of the capacitive means 152 and 156 six times, and during alternating charging intervals.

The absolute angular orientation of the twelve inductors with respect to the magnet rotor 326 for a given position of the magneto armature 204 is preferably adjusted so that each trigger pulse renders one of the silicon controlled rectifiers conductive at a time just after the corresponding capacitive means has been fully charged, that is, just after the end of the charging pulse applied to that capacitive means, rather than during the time when the charge is building up on the capacitive means, so that full voltage may be realized across the capacitive means. In addition, each successive inductor in the circular array supplies control pulses to a different one of the two sets of silicon controlled rectifiers, so that capacitors 152 and 156 are alternately discharged.

In the preferred embodiment, means are also provided for limiting the maximum amplitude of the pulses applied across the capacitive means. In the example shown in FIGURE 2 these means comprise a resistor 400 and a zener diode 402 connected in parallel with capacitive means 152 and a resistor 404 and zener diode 406 connected in parallel with capacitive means 156. The zener diode is so poled in each case that it is normally non-conductive when relatively small positive voltages are applied to the upper plate of the associated capacitor, but breaks down to become conductive whenever the voltage across the associated capacitor exceeds a preselected maximum value, thus preventing further increases in the voltage across the capacitor. In this way the voltage across the two capacitive means is effectively regulated to a predetermined maximum value despite the occurrence of large voltage charging pulses at high engine speeds.

The advantages of dividing the cylinders and their associated sparkplugs into two sets operated from two different capacitive means will be more fully appreciated from the following. The normal and desired order of events with respect to any sparkplug and its associated ignition circuits is that first the associated capacitive means should be charged to the full value of the charging pulse applied thereto, then a trigger pulse will render one of the silicon controlled rectifiers connected to that capacitive means conductive so as to fire one of the sparkplugs of the corresponding set, and then that silicon controlled rectifier will become non-conductive so that the next capacitor charging pulse can be effective to charge the capacitor again. As the engine speed increases, the total time interval available for completing all of these operations in sequence becomes smaller and more critical, and practical difficulties arise due to the necessity for utilizing charging and trigger pulses of finite widths and electronic switching devices such as a silicon controlled rectifier which generally require some finite time to recover their non-conductive state after having been rendered conductive. By utilizing two capacitors alternately, rather than one, the time interval between successive dischargings of the two capacitors is doubled for a given engine speed, thus permitting a doubling of the engine speed before the same practical limitations on circuit operation begin to arise. Accordingly the use of the plural capacitive arrangement is especially effective where a large number of cylinders are utilized, and are to be operated at high engine speeds with reliable firing of the sparkplugs. It is also highly advantageous where the engine uses odd firing, i.e. where the interval between certain successive sparkplug firings is not uniform but instead differs substantially according to a predetermined firing pattern; in this case the time between certain successive sparkplug firings is shorter than if even or uniform firing were used for the same engine speed, and our plural capacitive arrangement is effective in accommodating these shorter inter-firing intervals.

FIGURE 3 illustrates an alternative form for a portion of the circuit of FIGURE 2 by which the amplitude of the charging pulses applied to the capacitive means may be limited, corresponding parts being indicated by corresponding numerals. The circuit of FIGURE 3 differs from that of FIGURE 2 in that the two resistors 400 and 404 and the zener diodes 402 and 406 of FIGURE 2 are eliminated and replaced by two branch circuits connected between a tap 502 on coil 202 and a bridge junction point 216. One branch circuit comprises the rectifier 504 and the zener diode 506 in series with each other, and the other branch circuit comprises the rectifier 508 and zener diode 510 in series with each other. In each of the branch circuits the directions of forward conduction of the rectifier and zener diode are opposed to each other, and further the polarity of the rectifier and zener diode in one of the branch circuits is opposite to the polarities of the corresponding elements of the other branch circuit. When the voltages developed across the winding 202 are relatively low, one of the elements in each of the branch circuits is in its non-conductive state no matter which polarity or voltage appears at tap 502. However, when the voltage across coil 202 exceeds a predetermined value one branch circuit conducts strongly during one half-cycle of the alternating voltage and the other branch circuit during the other half-cycle, thus producing a substantial short circuit across the lower portion of the winding 202 under these conditions. The arrangement therefore acts as a "spoiler" circuit to limit the amplitude of the voltage applied between the junction points 210 and 216 of the split-bridge circuit 206.

For example, when the voltage at tap 502 is positive and exceeds the predetermined level, the diode 504 applies to zener diode 506 a reverse voltage greater than the zener breakdown voltage of diode 506, causing conduction in the first branch circuit. Similarly when the voltage at tap 502 is negative and greater than a preselected value the diode 508 permits the application across zener diode 510 of voltage in excess of the zener breakdown voltage thereof, producing a substantial short circuit for such negative voltages in excess of the preselected value.

While the particular arrangement illustrated in FIGURE 2 for charging the two capacitor means 152 and 156 is especially advantageous and convenient, particularly in that it can be operated from a modified magneto structure and in that the output of the magneto structure is utilized at maximum efficiency by using only one charging pulse for each discharging of each capacitor, it is possible to realize many of the advantages of the plural capacitive system with quite different sources of charging voltage for the capacitors. For example, the magneto may be driven at a much higher rate than that described to produce capacitor-charging pulses at a greater rate than trigger pulses, so long as a sufficient interval is provided for the electronic switch such as the silicon controlled rectifier to become non-conductive before the next charging pulse reaches a substantial value; in this case each capacitor will be properly charged before the occurrence of its time for its discharging, even though some unnecessary charging pulses may be applied thereto. It is also possible to utilize a D.C. source, such as a battery, connected to the two capacitors with appropriate resistive isolation between the two capacitors. Particularly in the latter type of arrangement it is also possible to employ more than two capacitors and divide the cylinders into more than two sets, the capacitors again being discharged sequentially.

Figure 4A:
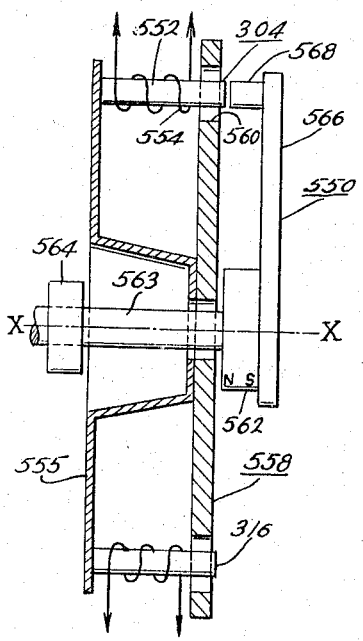
FIGURES 4A and 4B are sectional and plan views respectively of one form of apertured-plate, control-pulse-generating apparatus in accordance with a feature of the invention in one aspect.
Figure 4B:
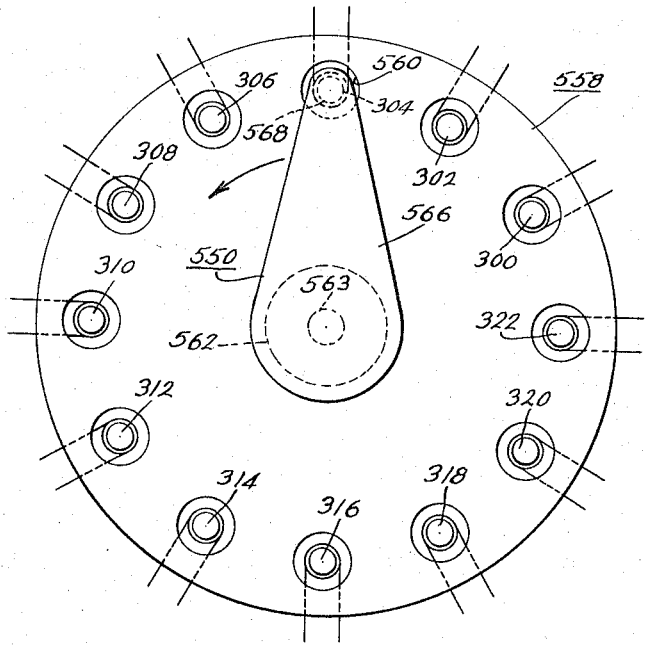

In accordance with another feature of the invention, the trigger pulse generator indicated as block 90 in FIGURE 1, and shown schematically as a rotating magnet with twelve surrounding inductors in the electrical schematic diagram of FIGURE 2, preferably and advantageously is of the general form shown in FIGURES 4A and 4B in which an apertured ferro-magnetic plate is disposed between the rotating magnet pole and the inductors. More specifically, in FIGURES 4A and 4B a magnetic rotor assembly 550 is arranged to rotate about the axis X—X in response to engine operation as described hereinbefore. Each of the inductors indicated by the even numerals from 300 to 322 may comprise a cylindrical core such as 552 surrounded by a trigger pulse coil such as 554, connected as shown in FIGURE 2. In this example each of the cores of the inductors is supported at one end on a circular plate 555 of ferro-magnetic material having a central frusto-conical boss to mount, and provide magnetic contact for, an apertured circular plate 558, also of ferro-magnetic material such as steel for example. A circular aperture such as 560 is provided in plate 558 in alignment with each of the inductors, each aperture preferably having a diameter somewhat greater than that of the corresponding inductor core. The magnet rotor assembly 550 in this example comprises a disc-shaped magnet 562, supported for rotation about the axis X—X by means of a shaft 563 journalled in bearings 564, and having a rotor arm 566 of ferro-magnetic material such as steel affixed to one of its pole faces. The radially extreme tip of rotor arm 566 has affixed thereto a cylindrical pole piece 568 of a diameter small compared with the distance between successive apertures in plate 558, and in this example may be of steel.

In the operation of the apparatus of FIGURES 4A and 4B, when the rotor assembly 550 is rotated so as to move the pole piece 568 over the region of the apertured plate 558 between successive apertures, the low magnetic reluctance of the plate 558 causes the magentic flux generated by magnet 562 to pass substantially entirely from pole piece 568 through plate 558 and back to magnet 562 without substantial fringing of magnetic flux through the inductors aligned with the apertures. However, when the pole piece 568 reaches the edge of one of the apertures, magnetic flux formerly returning through the apertured plate 558 begins to be transferred to a path extending through the core of the associated inductor and thence through the magnetic supporting plate 554 back to the magnetic supporting plate 554 back to the magnet 562. As the pole piece 568 rotates further toward exact alignment with the aperture, this flux through the inductor core increases rapidly, and thereafter decreases rapidly as the pole piece passes from the center of the aperture to the trailing edge of the aperture. The result is the generation of a positive pulse and a negative pulse of voltage in sequence across the inductor winding, as described hereinbefore.

The ferro-magnetic apertured plate 558 therefore provides clearer definition of, and distinction between, trigger pulses in successive inductors by preventing substantial magnetic flux from reaching more than one of the inductors at a time, and also causes the generation of more abrupt, steeper-sided trigger pulses by limiting the magnetic flux substantially entirely to the apertured magnetic plate until the rotor pole overlaps one of the apertures.

FIGURE 5 illustrates an alternative circuit arrangement for discharging the capacitors 152 and 156 through the various sparkplugs, the circuitry for charging the capacitors being the same as in FIGURE 2 so that corresponding parts are indicated by corresponding numerals. Each of the circuit arrangements such as 600 for firing the twelve sparkplugs is identical with the eleven others, and hence only one need be described in detail. As will become apparent, one of the advantages of the circuit of FIGURE 5 over that of FIGURE 2 lies in the fact that one end of each of the primaries of the step-up voltage transformers can be directly grounded, as to the engine block, so that only one wire, rather than two, need be run to each of the ignition circuits, the other signal path being provided through the common ground.

In this improved circuit of FIGURE 5 there is again employed a silicon controlled rectifier 602 which in this case has its anode connected directly to the positive voltage side of capacitor 152 and its cathode connected directly through the primary 604 of voltage step-up transformer 606 to ground. As in FIGURE 2, the secondary 608 of transformer 606 is connected between the lower end of primary 604 and the ungrounded sparkplug terminal. The trigger coil 304 of FIGURE 5 is connected in series with diode 616 between the control electrode and the cathode of the silicon controlled rectifier 602. The polarity of the diode 616 is such that only the positive-going portion of the trigger control signal is applied to the control electrode, and these positive pulses serve to turn on the silicon controlled rectifier in the same manner as was discussed previously in connection with FIGURE 2. Furthermore, by utilizing for diode 616 a silicon diode having an appreciable forward threshold voltage which must be exceeded before substantial conduction occurs through it, small extraneous interfering signals which may be applied to coil 304 are prevented from actuating the silicon controlled rectifier. The resistor 620 between cathode and control electrode of the silicon controlled rectifier serves to maintain a relatively low impedance between these elements so as to stabilize the silicon controlled rectifier. Since the lower ends of both windings of transformer 606 are directly grounded, only the single lead from capacitor 152 need be provided to the ignition circuit 600. Each of the eleven other ignition circuits has the same construction, operation and advantages, being supplied with trigger pulses from the appropriate trigger control coils of FIGURE 5 as indicated by corresponding numerals.

Figure 6A:
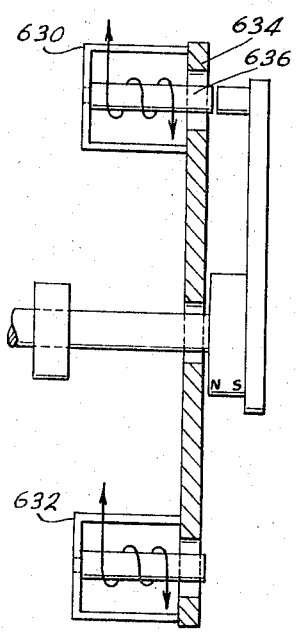
FIGURES 6A and 6B are sectional and plan views respectively of another form of apertured-plate, control-pulse-generating apparatus in accordance with one feature of the invention.
Figure 6B:
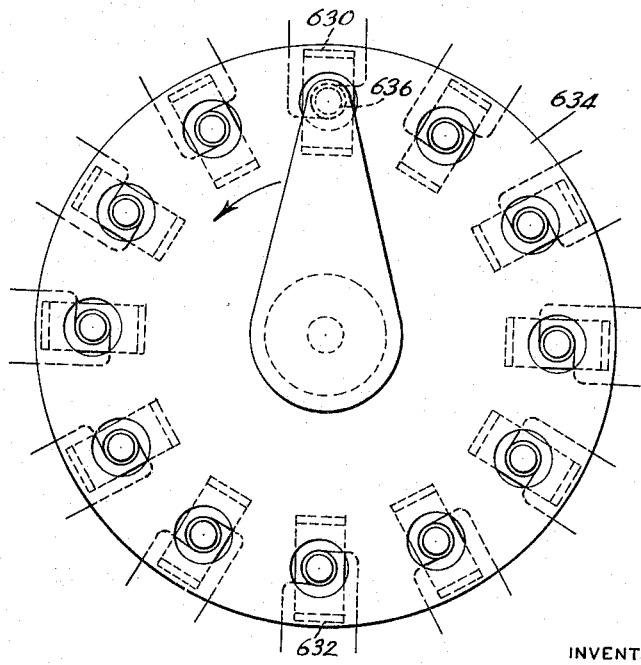

FIGURES 6A and 6B illustrate an improved form of the trigger generating apparatus shown in FIGURES 4A and 4B. The improvement lies in the use of the individual U-shaped members of magnetic material such as 630 and 632, one for each inductor, each of which members extends from the apertured plate 634 around the remote end of the corresponding inductor and back to the plate 634. Each such U-shaped member provides an individual, separate, short, low-reluctance return path for magnetic flux from the inductor core 636 back to the apertured plate 634, by way of the two opposite sides of the U-shaped member. Accordingly the tendency for crosstalk among the various inductors produced by the member 555 of FIGURE 4A is avoided. The magnetic path thereby provided is also shorter and a lower reluctance in the return path is realized. Furthermore, the fact that the U-shaped members surround the inductors on at least two sides provides a degree of magnetic shielding of the inductors from extraneous fields which might interfere with their operation. It will be understood that, if desired, the opposite sides of the U-shaped members may be extended circumferentially about the inductor, even to the point of engaging each other so as to form a cylindrical cup completely enclosing the inductor and thereby providing not only even further reduced magnetic reluctance but also substantially complete magnetic shielding.

Figure 7A:
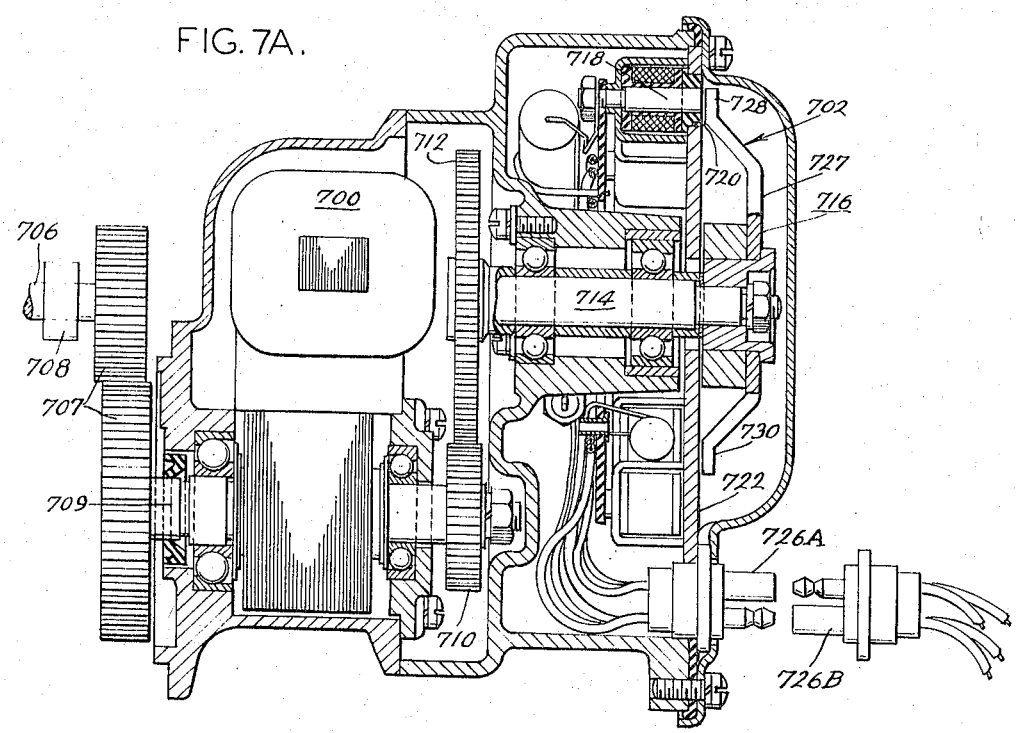
FIGURES 7A and 7B are, respectively, a sectional view and an end view with covering plate removed, of one preferred physical form of apparatus embodying certain features of the invention.
Figure 7B:
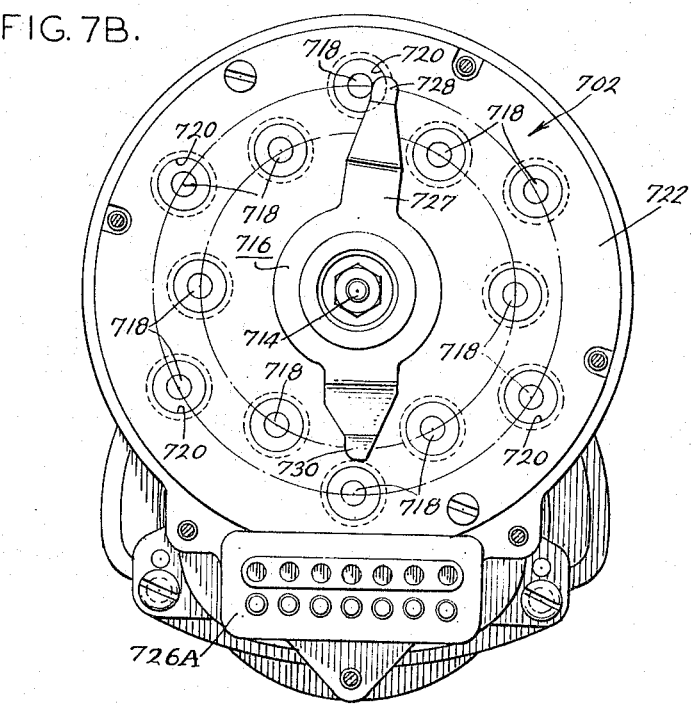

FIGURES 7A and 7B show a suitable preferred physical form for one embodiment of the invention. In this arrangement the magneto assembly 700, the trigger pulse generating apparatus 702, and the circuitry for charging the two capacitors are all included in a common unitary assembly. An input drive shaft 706 constituting an extension of, or mechanically coupled to, the crank shaft of the motor is journalled in bearings 708 to provide a rotating input for the armature of the magneto 700 by way of gears 707 and shaft 709. A gear 710 at the right-hand end of shaft 709 meshes with the gear 712 mounted at one end of the shaft 714 which drives the rotor assembly 716 of the trigger pulse generator. The trigger control pulse inductors such as 718 are mounted in line with the apertures such as 720 in the ferro-magnetic apertured plate 722, and electrical connection is provided by way of connector 726A, 726B to the sparkplugs and their associated high-voltage transformers, which are preferably located at the plugs as described more fully hereinafter.

The embodiment shown in FIGURES 7A and 7B employs a modified form of apertured plate and rotor which is especially advantageous in certain applications, particularly those involving large numbers of engine cylinders. Instead of placing all of the apertures in the plate 722 along a common circle, the twelve apertures are divided into two sets of six each, each set being disposed along a circle of different radius. The rotor arm 727 is double-ended in the sense that the rotor arm extends in both opposite directions from the axis of rotation thereof, so as to provide two poles 728 and 730, pole 728 being positioned so as to pass closely over the outer circle of apertures and 730 being arranged to pass closely over the inner circle of apertures. The two poles 728 and 730 and the apertures in plate 722 are arranged so that they induce pulses alternately in the inductors placed behind the two sets of apertures, i.e. first in an inductor in the outer circle and then an inductor in the inner circle. In this way the physical spacing between adjacent apertures and between inductors can be increased, so as to make more reliable and less critical the opertion of the trigger generating apparatus, especially for high engine speeds and/or large numbers of cylinders.

FIGURE 8 illustrates one possible modification for each of the apertures and associated inductor described hereinbefore, in which modification each inductor 800 and each aperture 802 in the magnetic plate 804 is rectangular, in this case square, rather than circular as in the preceding embodiments. These and other shapes of the apertures and inductors may be utilized to provide different control pulse shapes and different types of timing advance, as will be apparent from the following detailed explanation of the action exerted by a moving pole on an inductor located in line with an aperture in a magnetic plate.

Each of FIGURES 9A, 9B and 9C show a portion of a ferro-magnetic apertured plate 900 as used in the trigger-generating apparatus described hereinbefore, an aperture 902 therein, a cylindrical coil 904 aligned with the aperture, and a cylindrical rotor pole 906. In accordance with basic principles the voltage induced in the inductor winding in each case is proportional to the rate at which the magnetic flux linkage through the inductor changes at any time. The rate at which flux linkage changes, in turn, depends upon the speed of the rotor pole 906 in the vicinity of aperture 902 and the instantaneous position of the rotor pole with respect to the edge of the aperture and the center of the inductor. The steepness of the waveform of the pulse induced in the inductor, i.e. the rate of increase of voltage across the inductor during initial phases of pulse generation, is significant because the time at which the sparkplugs are fired is determined by the time at which the control pulses reach a certain amplitude for which the silicon controlled rectifier is rendered conductive.

At high engine speeds the rotor 906 will be moving rapidly and hence will produce a high rate of change of flux linkage in the inductor even though it is just beginning to reach the leading edge of the aperture 902, in which position the total amount of flux reaching the inductor is not great; such a position is shown in FIGURE 9A. Accordingly at such high engine speeds the voltage induced in the inductor will reach the critical level for firing a silicon controlled rectifier at the illustrated early point in the motion of pole 906. At lower speeds, however, the rotor 906 will have to move into a further overlapping position with respect to aperture 902, as illustrated in FIGURE 9B, before the rate of change of flux to the inductor is sufficiently high to produce the critical firing voltage. For still lower engine speeds, as illustrated in FIGURE 9C, the rotor pole 906 will not produce the critical voltage in the inductor until it has travelled even further toward complete alignment with the inductor. Accordingly the rotor angle at which the sparkplugs are fired is advanced as the engine speed increases, thus providing an automatic spark advance as is highly advantageous in internal combustion engines.

The amount of this advance which is obtainable depends upon the distance $d$ between the leading edge of the aperture 902 and the leading side of the inductor. Thus if this spacing is extremely small, then the change in rotor angle corresponding to $d$ is so small that only a small advance in firing time can be obtained, and conversely if this spacing is large a large automatic advance can be obtained. FIGURES 9D and 9E illustrate two different aperture shapes for which greater timing advance is obtained by making this spacing $d$ greater. In the case of FIGURE 9D the circular aperture is modified at its leading edge to project forwardly toward the advancing rotor, while in FIGURE 9E the aperture is simply made greater in radius to provide a greater spacing $d$. Many other special shapes both of the aperture and of the rotating pole piece may be utilized to produce different special effects on the trigger pulse shape and timing advance.

FIGURES 10A, 10B and 10C illustrate the preferred location and construction of the voltage step-up transformers such as 132 of FIGURE 2 and 612 of FIGURE 5. As shown, each of the voltage step-up transformer assemblies 920 is disposed immediately adjacent the sparkplug 922 which it is to fire, with the result that the relatively long leads from the discharge capacitors to the voltage step-up transformers operate at relatively low voltages, with resultant reduction in power losses, the leads from the high-voltage secondary of the transformer to the sparkplug being extremely short. This also eliminates the maintenance problem existing when high-voltage cables of substantial length are employed.

The basic electrically-functioning elements of the transformer assembly comprise a core 926 of high-frequency magnetic material such as ferrite, around which is wound a simple helical primary coil 928 the opposite ends of which in this example are connected to the primary leads 930 and 932. An insulating sleeve 934 is placed over the primary winding and core, and a secondary 936 comprising seven sectional pi's is wound outside the primary 928 and the sleeve 934. In this example one end 940 of the secondary 936 is connected to a conductive tab 942, and the other end is connected by way of a strap 944 to a conductive cap 946 which fits into the upper end of a generally cylindrical outer case of insulating material 947. This complete coil assembly may be slipped on the the top of the sparkplug 922 as shown, so that the connector tab 942 contacts the metallic center pin on the plug which leads to the ungrounded spark electrode in the plug. A retaining spring 950 may be provided above the assembly if desired, and the outer shell 947 may be filled with an epoxy resin 952 to hold the leads and parts in position and to seal out contaminants.

In the form of coil assembly shown in FIGURES 10A, 10B, and 10C, one end of the secondary coil is connected to the ungrounded end of the sparkplug, an arrangement which is suitable for use in either the circuit in FIGURE 2 or that in FIGURE 5. Where the coil assembly shown is utilized in an arrangement such as that in FIGURE 2, the strap 944 at one end of the secondary coil may be connected to one of the leads 930 or 932, or may be connected to one of the ends of the primary coil internally of the assembly. Where the circuit shown in FIGURE 5 is utilized, one of the leads 930 and 932 may be connected to the strap 944 or to the associated cap 946, and the spring 950 may be of electrically-conductive material contacting the top cap and bearing against a grounded support (not shown), so as to provide the ground for the common connection between the primary and secondary coils.

FIGURES 10A, 10B and 10C show one preferred way of mounting the high-voltage transformers near sparkplugs, and many other mechanical arrangements will occur to one skilled in the art in view of the foregoing teachings. The use of a high-frequency magnetic material for the core 926, such as a ferrite material of the type utilized in radio applications, and the use of a secondary winding having low-distributed capacitance by virtue of its pi windings, result in the preservation of a steep leading edge and a narrow width for the pulses applied to each sparkplug. The pi-wound secondary also is advantageous in reducing the high-voltage problems often occurring in ordinary helical windings, since the parts of the pi-wound secondary coil between which large voltage differences are developed are spaced from each other by substantial distances.

The use of such a steep-rising and narrow pulse applied to the sparkplugs has a number of advantages. First, the accuracy of the timing with which the plug is fired is improved by the steep wave front. Secondly, with a narrow pulse less electrical energy is discharged through the sparkplug, with a resultant reduction in erosion of the electrodes of the plug and hence increased service life of the plugs. Thirdly, more reliable firing of sparkplugs fouled by a partially-conductive film is obtained, due to the rapid rise time of the pulse which apparently prevents energy of the pulse from leaking off substantially through the film.

The split-bridge circuitry illustrated in FIGURES 2 and 5 is especially advantageous for certain applications, particularly those involving large numbers of cylinders and high engine speeds, as described hereinbefore, but in certain instances where the number of cylinders is lower and in other cases a simpler type of circuitry shown in FIGURE 11 may be utilized. In this simplified circuit, which is less expensive than the preceding circuits, a single capacitive means 950 is employed for supplying current discharges to all of the cylinder ignition means, by way of the terminals 952 and 954; a voltage-amplitude limiting circuit comprising resistor 956 and zener diode 958 is again used in parallel with the capacitor. The alternating voltage for charging the capacitor is developed across a coil 960, but the coil is connected to the capacitor 950 by way of a single diode 962 which passes only the positive voltages to the upper plate of capacitor 950, a resistor 964 and diode 966 being connected in series with each other across the coil 960 to dissipate the energy of the negative voltage pulses occurring at the top of coil 960.

While the invention has been described with particular reference to specific embodiments thereof in the interests of complete definiteness, it will be understood that it may be embodied in a large variety of forms diverse from those specifically shown and described, without departing from the scope and spirit of the invention as defined by the appended claims.

We claim:

1. An ignition system for an internal combustion engine comprising a plurality of cylinders at least four in number each having an igniting element responsive to voltage applied thereto to produce ignition of fuel therein, said system comprising:

first and second separate capacitive means;
a source of voltage of alternating polarity and rectifying means connecting said source to said first and second capacitive means alternately to charge them to voltages of the same polarity;
two sets of normally non-transmissive electrically-controllable switching means, each said sets being connected between a different one of said first and second capacitive means and a corresponding set of said igniting elements, each of said switching means being responsive to a control pulse applied thereto to become transmissive and to discharge one of said capacitive means through one of said igniting elements;
pulse-generating means for generating electrical control pulses and for applying them to said switching means in synchronism with operation of said engine to render said plurality of switching means transmissive in sequence, said pulse-generating means applying successive control pulses to different ones of said sets of switches thereby to produce successive discharges from different ones of said capacitive means;
said pulse-generating means comprising a plurality of spaced conductive pick-up means each connected to a different one of said switch means, a rotor having a magnet element thereon and rotatable to move said magnet element through positions of substantial alignment with different ones of said pick-up means successively, and an apertured plate of magnetic material interposed between said pick-up means and said magnet element and having a plurality of apertures therein each in substantial alignment with a different one of said pick-up means.

2. The system of claim 1, in which each of said pick-up means comprises a core of magnetic material and a coil of wire thereon, and in which each of said apertures extends beyond its associated core in the direction of approach of said magnet element.

3. The system of claim 1 comprising a plurality of voltage step-up transformers disposed adjacent different ones of said igniting elements, the primary of each of said transformers being supplied with an electrical pulse from one of said capacitive means upon the occurrence of each of said discharges of said one capacitive means, each of said transformers comprising a ferrite core and a pi-wound secondary.

4. An ignition system for an internal combustion engine, comprising:

means for generating a train of pulses, alternate pulses of which train are of opposite polarities;
first capacitive means;
means selectively responsive to those of said pulses of one of said polarities to charge said first capacitive means;
second capacitive means;
means selectively responsive to those of said pulses of the other of said polarities to charge said second capacitive means;
a first and a second set of engine fuel igniting means, each of said igniting means being responsive to voltage pulses applied thereto to ignite combustible fuel in said engine;
first switch means connecting said first capacitive means to said first set of igniting means;
second switch means connecting said second capacitive means to said second set of igniting means;
said first switch means being responsive to control pulses applied thereto to discharge said first capacitive means through said igniting means of said first set, and said second switch means being responsive to control pulses applied thereto to discharge said second capacitive means through said igniting means of said second set; and
means for generating and applying control pulses alternately to said first and second switch means in synchronism with operation of said engine, thereby to ignite said fuel;
said operating means comprising a magnet, a plurality of inductors spaced around a circle, means for rotating said magnet past said inductors in sequence and in synchronism with operation of said engine to generate control pulses in said inductors, an apertured plate of magnetic material interposed between said magnet and said inductors and having apertures therein each substantially aligned with a different one of said inductors.

5. The system of claim 4, in which said means for generating a train of pulses comprises an alternating voltage generator having an armature rotatable in synchronism with operation of said engine at a rate such that said control pulses recur at the same frequency as said pulses of said train.

6. An ignition system for an internal combustion engine, comprising:

means for generating a train of pulses, successive pulses of which train are of opposite polarities;
first capacitive means;
means selectively responsive to those of said pulses of one of said polarities to charge said first capacitive means;
second capacitive means;
means selectively responsive to those of said pulses of the other of said polarities to charge said second capacitive means;
a first and a second set of engine fuel igniting means, each of said igniting means being responsive to voltage pulses applied thereto to ignite combustible fuel in said engine;
first switch means connecting said first capacitive means to said first set of igniting means;
second switch means connecting said second capacitive means to said second set of igniting means;
said first switch means being responsive to control pulses applied thereto to discharge said first capacitive means through said igniting means of said first set, and said second switch means being responsive to control pulses applied thereto to discharge said second capacitive means through said igniting means of said second set; and
means for generating and applying control pulses alternately to said first and second switch means in synchronism with operation of said engine to discharge said first and second capacitive means alternately through igniting means of said first set and said second set.

7. The system of claim 6, in which each of said fuel igniting means comprises an igniting element responsive to voltage applied thereto to produce fuel ignition and a voltage step-up transformer having its primary connected to one of said switch means and its secondary connected to said fuel igniting element, said transformer having a ferrite core of high-frequency-response characteristics and said secondary comprising a coil of low-distributed-capacity form.

8. An ignition system for an internal combustion engine having an even number greater than two of cylinders, each having an igniting means responsive to voltage applied thereto to produce ignition of fuel in its associated cylinder, said system comprising:
first capacitive means and second capacitive means electrically isolated from each other;
a generator of pulses of alternately opposite polarities recurrent at the firing rate of said engine;
split-bridge rectifier means for charging said first capacitive means selectively in response to said generator pulses of a first polarity and for charging said second capacitive means selectively in response to said generator pulses of a polarity opposite to said first polarity;
a first set of electrically controllable switches each connecting said first capacitive means to a different one of said igniting means of one half of said even number of cylinders, and a second set of electrically controllable swicthes each connecting said second capacitive means to a different one of said igniting means of the other half of said even number of cylinders, said switches normally being in their electrically open condition, those of said igniting means to be fired in immediate succession being connected by said switches to different ones of said first and second capacitive means;
means responsive to operation of said engine for generating a series of control pulses, one pulse for each successive time at which an igniting means of said engine is to be operated; and
means for supplying successive ones of said control pulses to different ones of said first and second sets of controllable switches to discharge said first and second capacitive means alternately through said igniting means.

9. In an ignition system for an internal combustion engine of the class comprising means for developing voltages for application to igniting means to ignite fuel in said engine, means for rotating a magnet pole and a conductor past each other in synchronism with engine operation to generate control pulses in said conductor, and means for controlling application of said voltages to said igniting means in response to said control pulses, the improvement which comprises an apertured plate of magnetic material interposed between said magnet pole and said conductor and having an aperture therein of limited circumferential extent, said plate being fixed with respect to one of said magnet pole and said conductor, said aperture being substantially aligned with said conductor and said magnet pole when said conductor and said magnet pole pass each other, whereby flux from said magnet pole reaching said conductor is reduced until said magnet pole is in substantial alignment with said conductor.

10. Apparatus in accordance with claim 9, comprising a core of magnetic material on which said conductor is wound, said core being substantially aligned with said aperture, said aperture extending beyond alignment with said core in the direction of approach of said magnet pole thereto.

11. Apparatus in accordance with claim 9, comprising a plurality of additional conductors spaced along the path of motion of said magnet pole, said plate comprising a plurality of additional apertures therein substantially aligned with different ones of said additional conductors.

12. The apparatus of claim 11, comprising a plurality of members of magnetic material, each extending from said plate adjacent one of said apertures around the associated one of said conductors.

13. Apparatus for producing electrical signals indicative of the phase of operation of an engine, comprising:
magnet means;
electrical conductor means;
means responsive to engine operation for producing relative motion of said magnet means and said conductor means through a position of nearest approach to each other occurring when said engine is in a predetermined phase of its operation, whereby an electrical signal is produced in said conductor for said predetermined engine phase; and
a shield of magnetic material between said magnet means and said conductor and fixed with respect to one of said magnet means and said conductor means, said shield having an aperture therethrough adjacent said one means to permit magnetic coupling of said magnet means to said conductor means for a limited range of relative positions of said magnet means and said conductor means.

14. Apparatus for producing control pulses indicative of the phase of operation of an engine, comprising:
magnet means for generating a substantially constant magnetic flux;
an array of electrical pick-up coils arranged around a center;
means responsive to operation of said engine for rotating said magnet means about said center through successive positions adjacent different ones of said coils to induce separate electrical pulses in each of said coils as said magnet means passes it; and
a multi-ply-apertured plate of magnetic material between said rotating magnet means and said array of coils, said plate having a different aperture therethrough adjacent each of said coils to permit strong magnetic coupling from said magnet means to each of said coils when said magnet means passes each said coil and to attenuate sharply said magnetic coupling for other positions of said magnet means.

15. An ignition system for an internal combustion engine, comprising:
a plurality of separate capacitive means;
means for charging said capacitive means;
said charging means comprising a source of separate pulse trains, one train for each of said capacitive means, said pulses recurring at the same frequency in all said trains but at different times in different ones of said trains, and means for supplying each of said trains to a different one of said capacitive means;
said source comprising a generator of pulses of alternately opposite polarities and means for forming a separate pulse train from pulses of each of said polarities;
said generator comprising an output coil across which said pulses are developed, and said means for forming a separate pulse train from pulses of each of said polarities comprising a split-bridge rectifier circuit;
fuel ignition means for said engine connected to said capacitive means to produce fuel ignition in response to discharge of each of said capacitive means; and
switch means controlled by said engine for discharging said capacitive means in sequence, thereby to produce successive fuel ignitions in response to discharge of different ones of said capacitive means, said switch means comprising silicon-controlled rectifiers connected in the discharge path of each of said capacitive means.

References Cited by the Examiner
UNITED STATES PATENTS

| | | | |
|---|---|---|---|
| 2,180,358 | 11/1939 | Hooven | 315—209 |
| 2,497,307 | 2/1950 | Lang | 315—213 |
| 2,602,149 | 7/1952 | Brunelle | 315—218 |
| 2,787,649 | 4/1957 | Ballard | 315—209 |
| 2,918,913 | 12/1959 | Guiot | 315—209 |
| 3,078,391 | 2/1963 | Bunodiere | 315—209 |

JOHN W. HUCKERT, *Primary Examiner.*

D. O. KRAFT, *Assistant Examiner.*

UNITED STATES PATENT OFFICE
CERTIFICATE OF CORRECTION

Patent No. 3,311,783　　　　　　　　　　　　　　　　March 28, 1967

Leslie E. Gibbs et al.

It is hereby certified that error appears in the above numbered patent requiring correction and that the said Letters Patent should read as corrected below.

Column 3, line 12, for "step" read -- steep --; column 5, line 65, for "60-70" read -- 50-70 --; column 7, line 48, for "51" read -- 151 --; column 11, lines 1 and 2, strike out "through the magnetic supporting plate 554 back to the magnetic supporting plate 554 back to the magnet 562." and insert instead -- through the magnetic supporting plate 554 back to the magnet 562. --. column 16, line 18, for "operating" read -- generating --; column 18, line 24, for "multi-ply-apertured" read -- multiply-apertured --.

Signed and sealed this 7th day of November 1967.

(SEAL)
Attest:

EDWARD M. FLETCHER, JR.　　　　　　　　　　　EDWARD J. BRENNER
Attesting Officer　　　　　　　　　　　　　　　Commissioner of Patents